(12) United States Patent
Yamawaki

(10) Patent No.: US 8,845,348 B2
(45) Date of Patent: Sep. 30, 2014

(54) ROTATABLE CONNECTOR DEVICE

(71) Applicants: Furukawa Electric Co., Ltd., Tokyo (JP); Furukawa Automotive Systems Inc., Shiga (JP)

(72) Inventor: Kosuke Yamawaki, Shiga (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 0 days.

(21) Appl. No.: 14/042,364

(22) Filed: Sep. 30, 2013

(65) Prior Publication Data

US 2014/0027557 A1    Jan. 30, 2014

Related U.S. Application Data

(63) Continuation of application No. PCT/JP2012/057265, filed on Mar. 22, 2012.

(30) Foreign Application Priority Data

Mar. 29, 2011    (JP) .................................. 2011-071368

(51) Int. Cl.
| | |
|---|---|
| *H01R 3/00* | (2006.01) |
| *B60R 16/027* | (2006.01) |
| *H01R 35/02* | (2006.01) |
| *F16D 3/12* | (2006.01) |

(52) U.S. Cl.
CPC ................ *F16D 3/12* (2013.01); *B60R 16/027* (2013.01); *H01R 35/025* (2013.01)
USPC ............................................ 439/164; 439/15

(58) Field of Classification Search
USPC .............. 439/15, 164; 242/328.1, 396.1, 400; 280/728.2, 780; 74/495; 188/71.4; 200/61.54, 61.55
See application file for complete search history.

(56) References Cited

U.S. PATENT DOCUMENTS

| | | | | |
|---|---|---|---|---|
| 3,734,245 A | * | 5/1973 | Hubbard | 188/71.4 X |
| 5,637,005 A | * | 6/1997 | Bannai et al. | 439/164 |
| 6,368,127 B1 | * | 4/2002 | Araki et al. | 439/164 |
| 7,104,821 B2 | * | 9/2006 | Araki et al. | 439/164 |

FOREIGN PATENT DOCUMENTS

| | | |
|---|---|---|
| EP | 693806 A1 | 1/1996 |
| JP | H01-155289 U | 10/1989 |
| JP | H11-187557 A | 7/1999 |
| JP | 2003-252207 A | 9/2003 |
| JP | 2009-193688 A | 8/2009 |
| JP | 2009/224061 A | 10/2009 |

OTHER PUBLICATIONS

International Search Report issued in International Application Na PCT/JP2012/057265, mailed on May 29, 2012 (2 pages).

* cited by examiner

*Primary Examiner* — Gregory Binda
(74) *Attorney, Agent, or Firm* — Osha Liang LLP

(57) ABSTRACT

A relative rotation restriction unit includes a rotation restriction body for restricting a stator and a rotator, which are in engagement with each other coaxially so as to be rotatable with respect to each other, from rotating with respect to each other at a restriction position, and an urging unit for elastically supporting the rotation restriction body toward the restriction position.

4 Claims, 8 Drawing Sheets

ROTATABLE CONNECTOR DEVICE

TECHNICAL FIELD

The present invention relates to a rotatable connector device for, for example, electrically connecting elements on the side of a steering wheel of an automobile and the side of a vehicle body to each other.

BACKGROUND ART

A rotatable connector device which is mountable on a vehicle such as an automobile or the like includes a stator which is to be fixed mainly on the side of a vehicle body and a rotator which is to be assembled to the side of a steering wheel. The stator and the rotator are assembled together coaxially so as to be rotatable with respect to each other. In addition, a flat cable is accommodated in an accommodation space formed by the stator and the rotator such that the flat cable can follow the rotation of the steering wheel to be wound and rewound.

The flat cable electrically connects an electric device such as a horn module, an airbag module, an audio control module or the like equipped on the side of the steering wheel and a power supply on the side of the vehicle body to each other.

When such a rotatable connector device is assembled to the vehicle body or the steering wheel, the rotator occasionally rotates to cause the flat cable to be wound in a lopsided manner. When this occurs, the assembly may be performed in the state where the neutral position in a rotation direction of the steering wheel and the neutral position in the rotation direction of the rotatable connector device are shifted from each other. In the case where the rotatable connector device is assembled to the vehicle body in the state where the neutral position thereof in the rotation direction is not the neutral position in the rotation direction of the steering wheel, there is an undesirable possibility that when the steering wheel is rotated, the flat cable is ruptured.

Thus, a rotatable connector device, as described in Patent Document 1, including a relative rotation restriction unit for restricting relative rotation such that the rotator and the stator are not rotated with respect to each other until the steering wheel is completely assembled has been proposed.

The rotatable connector device described in Patent Document 1 operates as follows. A stopper, which is pushed up in an axial direction by the elasticity of a coil spring accommodated in a stator, is put into engagement with an opening of a rotator. This restricts the rotator and the stator 3 from rotating with respect to each other. When the stopper is pushed down by a cored bar of a steering wheel (corresponding to a steering device in Patent Document 1), the stopper is released from the opening. Patent Document 1 describes that the rotator and the stator are restricted from rotating with respect to each other, and are released from the restriction, by such a relative rotation restriction unit.

Today, meanwhile, a rotatable connector device is desired to be reduced in size because of constrains regarding an accommodation space on the side of the vehicle body.

However, the rotatable connector device including the relative rotation restriction unit as described in Patent Document 1 requires an accommodation space, for accommodating the coil spring, which has a height in the axial direction corresponding to a total sum of diameters of wire parts of the coil spring stacked in a contracted state, at least when the rotator and the stator are released from the restriction on the relative rotation.

In an attempt to solve this problem, Patent Document 2 disclosing a rotatable connector device shows, in figures, a rotation restriction unit using a coil spring having a hand drum shape as seen in a side view. Nonetheless, even though the hand drum-shaped coil spring is used so that the curved wire parts are stacked in a shifted manner when the coil spring is accommodated, in order to suppress the height thereof in the axial direction, it is difficult to significantly reduce the height of the accommodation space for the coil spring.

A rotatable connector device including the relative rotation restriction unit needs to allow for a stroke amount by which a stopper, for restricting the rotator and the stator from rotating with respect to each other and releasing the rotator and the stator from the restriction, moves in the axial direction. The stroke amount of the stopper needs to be set with a certain degree of margin in consideration of production variance and assembly variance. Owing to the margin, the stopper can restrict the rotator and the stator from rotating with respect to each other, and can release the rotator and the stator from the restriction, with certainty.

However, when the height of the rotatable connector device in the axial direction is reduced in order to fulfill the requirement of size reduction, the ratio of the height in the axial direction of the accommodation space for accommodating the contracted coil spring with respect to the height in the axial direction of the rotatable connector device is increased. Therefore, the stroke amount of the stopper cannot be set with a margin. When this occurs, the rotator and the stator may not be released from the restriction on the relative rotation with certainty.

As described above, the rotatable connector device including the relative rotation restriction unit using a coil spring has a problem of not sufficiently fulfilling the requirement of size reduction regarding the height in the axial direction.

CITATION LIST

Patent Literature

Patent Document 1: Japanese Laid-Open Patent Publication No. 2009-193688
Patent Document 2: European Patent No. 0693806

SUMMARY OF INVENTION

Technical Problem

In light of the above-described problem, the present invention has an object of providing a rotatable connector device which includes a relative rotation restriction unit and thus can be suppressed in height in an axial direction and can fulfill the requirement of size reduction.

Solution to Problem

The present invention is directed to a rotatable connector device including a stator including an annular fixed-side ring plate, a fixed-side outer circumferential cylindrical section having a cylindrical shape and formed along an outer circumferential edge of the fixed-side ring plate, and a fixed-side inner circumferential cylindrical section having a cylindrical shape and formed along an inner circumferential edge of the fixed-side ring plate; and a rotator including an annular rotatable-side ring plate and a rotatable-side inner circumferential cylindrical section having a cylindrical shape and formed along an inner circumferential edge of the annular rotatable-side ring plate. An outer circumferential surface of the fixed-side inner circumferential cylindrical section of the stator and an inner circumferential surface of the rotatable-side inner circumferential cylindrical section of the rotator face each other in a diametrical direction, and the stator and the rotator are in engagement with each other coaxially so as to be rotatable with respect to each other in a clockwise direction and a counterclockwise direction. The rotatable connector device further includes a relative rotation restriction unit for restricting the stator and the rotator from rotating with respect to each other. The relative rotation restriction unit includes a stop section protruding inward in the diametrical direction from a rotator-side end of the fixed-side inner circumferential cylindrical section; a rotation restriction body rotatable together with the rotator and engageable with the rotator so as to be movable between a restriction position and a restriction release position in the axial direction of the rotator; and an urging unit, located on the rotator, for elastically supporting the rotation restriction body toward the restriction position. The rotation restriction body includes a cylindrical section having a generally cylindrical shape and facing, in the diametrical direction, an inner circumferential surface of the fixed-side inner circumferential cylindrical section of the stator; and a brim section formed along a rotator-side outer circumferential edge of the cylindrical section. The cylindrical section of the rotation restriction body has an engaging section protruding outward in the diametrical direction, the engaging section being engageable with the stop section in the circumferential direction so as to restrict the rotator and the stator from rotating with respect to each other when the rotation restriction body is at the restriction position. The urging unit includes a thin plate-like elastic member including a plurality of tongue sections which are shaped like being raised obliquely upward and elastically support the brim section of the rotation restriction body.

According to the present invention, the rotatable connector device which includes the relative rotation restriction unit and thus can be suppressed in height in an axial direction and can fulfill the requirement of size reduction is provided.

Specifically, when the steering wheel is not attached, the rotation restriction body is elastically supported at the restriction position by the tongue sections, and the engaging section of the rotation restriction body is in engagement with the stop section of the stator in the circumferential direction. Thus, the rotation restriction body can restrict the rotator and the stator from rotating with respect to each other.

When the steering wheel is attached, the rotation restriction body is moved to the restriction release position. As a result, the engaging section of the rotation restriction body and the stop section of the stator are released from the engagement, and thus the rotator and the stator become rotatable with respect to each other.

In this state, the steering wheel presses the rotation restriction body and thus can significantly bend the tongue sections of the plate-like elastic member in the axial direction. Therefore, the height difference in the axial direction between the rotator and the brim section of the rotation restriction body can be made approximately equivalent to the thickness of the tongue sections. Namely, when the rotation restriction body is at the restriction release position, the height of the accommodation space for accommodating the plate-like elastic member can be suppressed to be approximately equivalent to the thickness of the plate-like elastic member.

Owing to this, the ratio of the height in the axial direction of the accommodation space for accommodating the plate-like elastic member with respect to the height in the axial direction of the rotatable connector device can be significantly reduced. Namely, even though the height in the axial direction of the rotatable connector device is suppressed, the stroke amount by which the rotation restriction body moves between the restriction position and the restriction release position can have a margin. As a result, the rotator and the stator can be restricted from rotating with respect to each other, and can be released from the restriction, with certainty.

In addition, use of the plate-like elastic member can reduce the weight of the rotatable connector device.

Therefore, the rotation restriction body moving between the restriction position and the restriction release position is elastically supported by the plate-like elastic member, and thus the height in the axial direction of the accommodation space for accommodating the plate-like elastic member can be suppressed. As a result, the rotatable connector device including the relative rotation restriction unit can be suppressed in height in the axial direction and can fulfill the requirement of size reduction.

In an embodiment of the present invention, a rotator-side end of each of the tongue sections may be shaped like being raised in a generally parabolic manner.

According to the present invention, the plate-like elastic member can generate a repulsive power by elasticity thereof more stably in a range from a region where the displacement amount of the tongue sections in the axial direction is minute to a region where the displacement amount of the tongue sections in the axial direction is maximum. Namely, the rotation restriction body is elastically supported stably at the restriction position, and also can move between the restriction position and the restriction release position more stably.

Therefore, the plate-like elastic member in which the tongue sections are shaped like being raised in a generally parabolic manner can stably restrict the rotator and the stator from rotating with respect to each other and can stably release the rotator and the stator from the restriction. Thus, the rotatable connector device including the relative rotation restriction unit can be suppressed in height in the axial direction and can fulfill the requirement of size reduction.

In an embodiment of the present invention, the plate-like elastic member may include a base section having an annular shape concentric with the rotator; and the plurality of tongue sections provided at an equal interval in a circumferential direction of the base section.

According to the present invention, the plate-like elastic member can have an annular shape having the plurality of the tongue sections. Even when the plate-like elastic member is rotated on the rotator, the interval between the plurality of tongue sections is not changed. Therefore, when the rotation restriction body is at the restriction position, the plate-like elastic member can elastically support the rotation restriction body stably by the repulsive power generated by the elasticity of the tongue sections.

Since the plurality of tongue sections are provided at an equal interval in the circumferential direction, the brim section of the rotation restriction body can be stably supported with good balance. Namely, the rotation restriction body does not move between the restriction position and the restriction release position while being inclined. Therefore, the engaging section of the rotation restriction body and the stop section of the stator are put into engagement with each other, and are released from the engagement, with more certainty.

Therefore, owing to the annular shape of the plate-like elastic member, the rotation restriction body can restrict the rotator and the stator from rotating with respect to each other, and can release the rotator and the stator from the restriction, more certainly. Thus, the rotatable connector device including the relative rotation restriction unit can be suppressed in height in the axial direction and can fulfill the requirement of size reduction.

In an embodiment of the present invention, a single-body plate-like elastic member may include a thin plate-like base section and the plurality of tongue sections formed on the base section; and the plate-like elastic member may include a plurality of the single-body plate-like elastic members provided at an equal interval in the circumferential direction.

According to the present invention, the plate-like elastic member can include the plurality of single-body plate-like elastic members, namely, the plurality of tongue sections. Owing to this, in the case where there is no space for locating the annular plate-like elastic member on the rotator, the plurality of single-body plate-like elastic members can be located in the circumferential direction of the rotator. Alternatively, in the case where the brim section of the rotation restriction body cannot be formed to be annular, the single-body plate-like elastic members can be placed on the rotator in accordance with the shape of the brim section of the rotation restriction body. Namely, in the case where the plate-like elastic member includes the plurality of single-body plate-like elastic members, the size of the rotatable connector device in the diametric direction can be reduced.

In the case where the plate-like elastic member includes the plurality of single-body plate-like elastic members, the plate-like elastic member can be reduced in weight. Therefore, the weight of the rotatable connector device can be reduced.

Accordingly, in the case where the plate-like elastic member is provided as being divided in correspondence with the plurality of tongue sections, the rotatable connector device including the relative rotation restriction unit can be suppressed in height in the axial direction and can fulfill the requirement of size reduction.

Advantageous Effects of Invention

According to the present invention, a rotatable connector device which includes a relative rotation restriction unit and thus can be suppressed in height in an axial direction and can fulfill the requirement of size reduction is provided.

DESCRIPTION OF EMBODIMENTS

Figure 1:
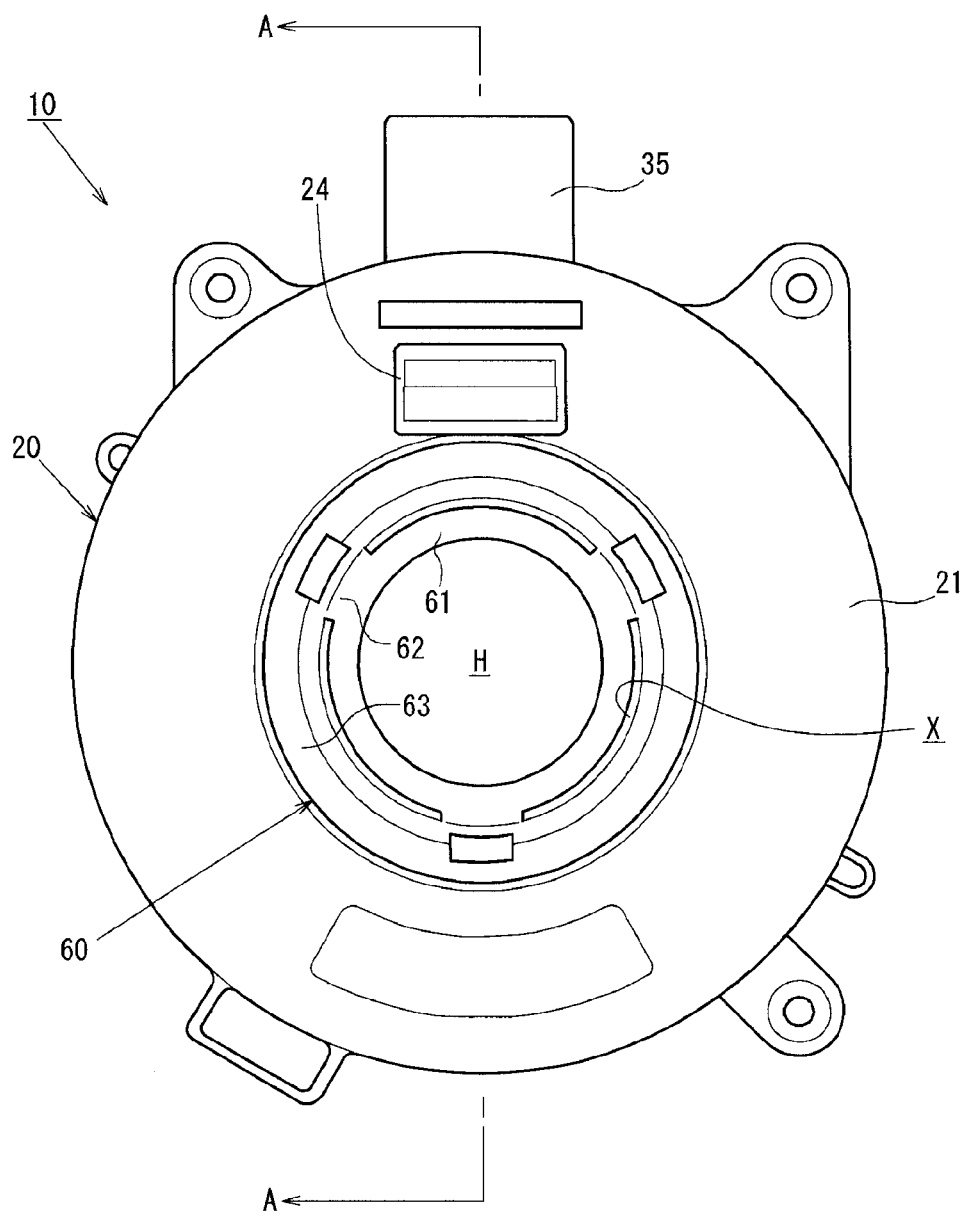
FIG. 1 is a plan view of a steering roll connector.
Figure 2:
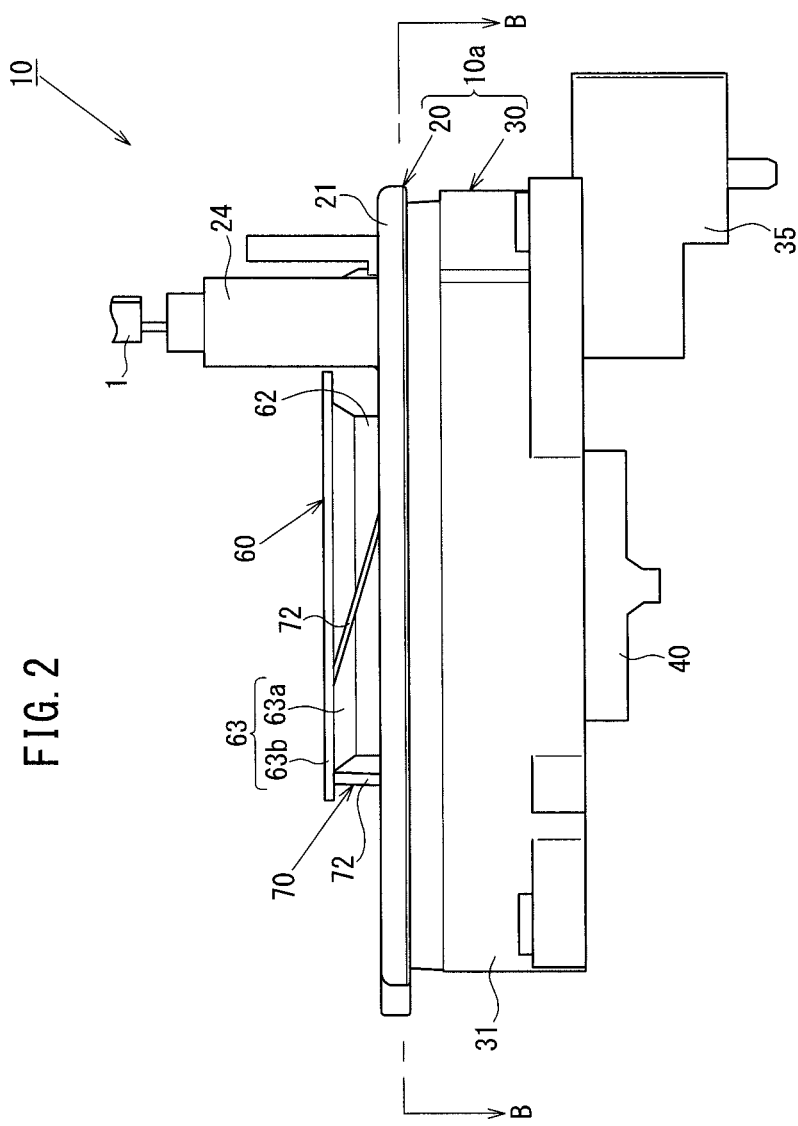
FIG. 2 is a right side view of the steering roll connector.
Figure 3:
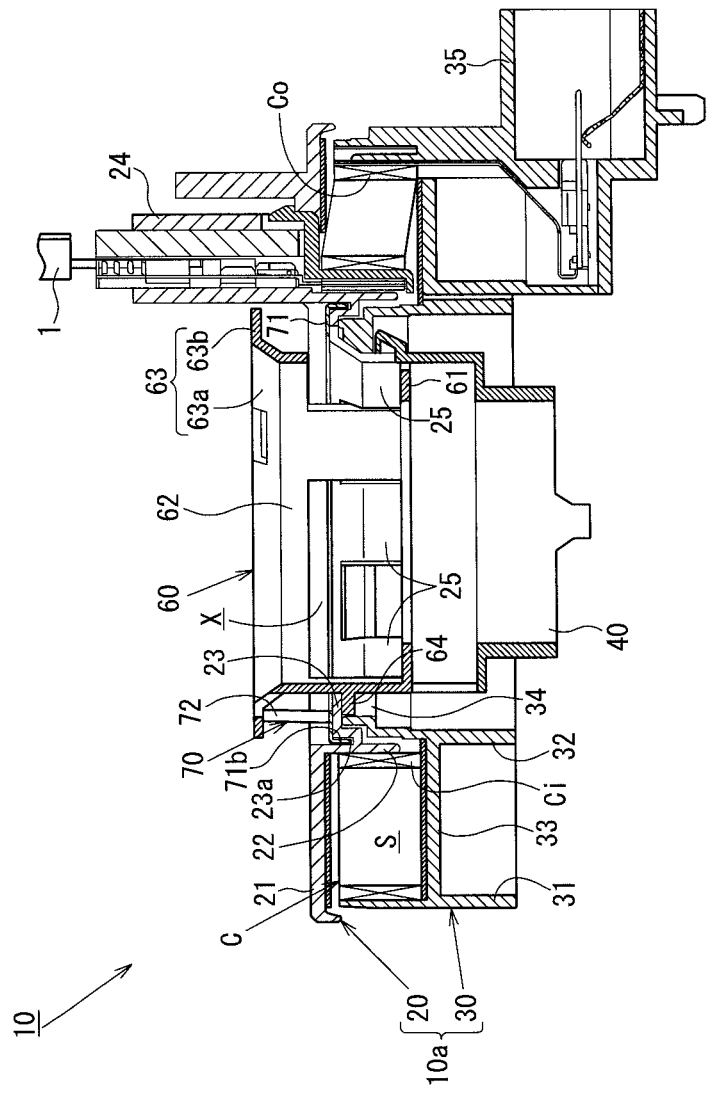
FIG. 3 is a cross-sectional view taken along line A-A in FIG. 1.
Figure 4:
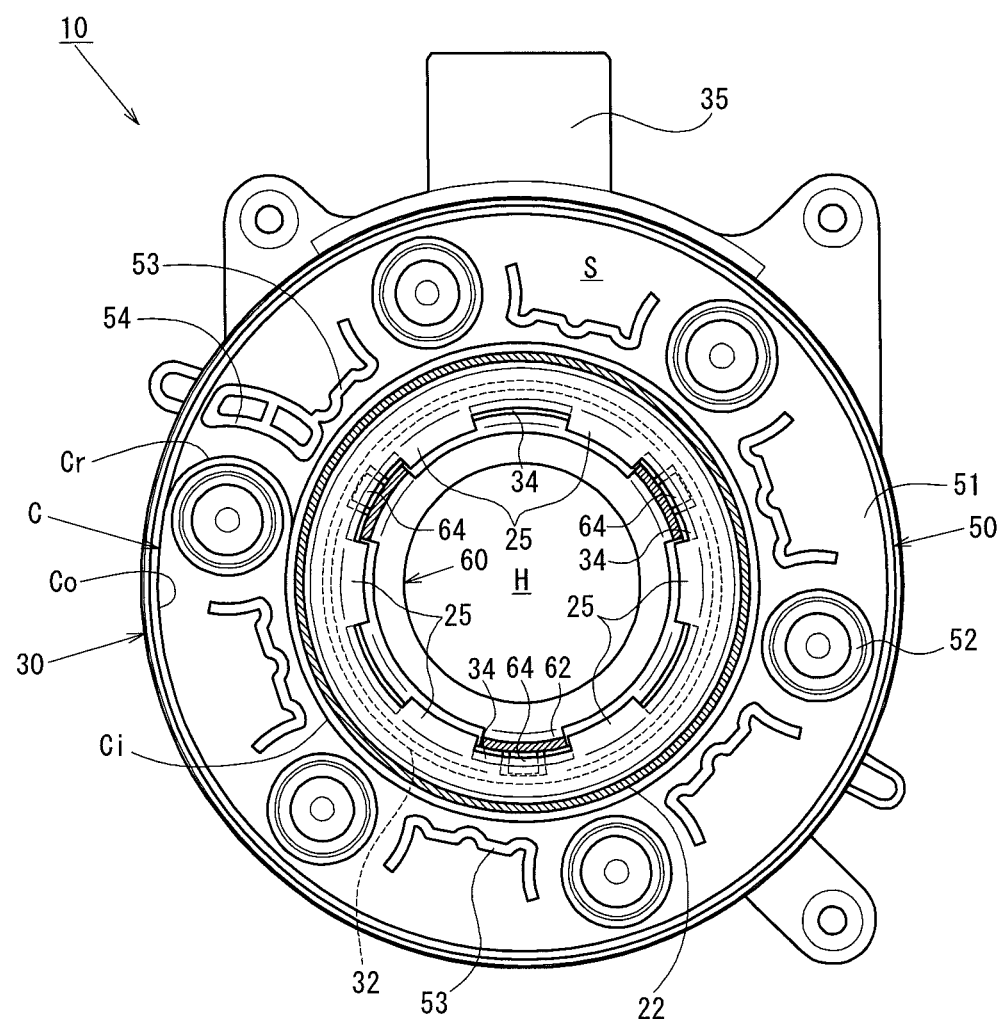
FIG. 4 is a cross-sectional view taken along line B-B in FIG. 2.
Figure 5A:
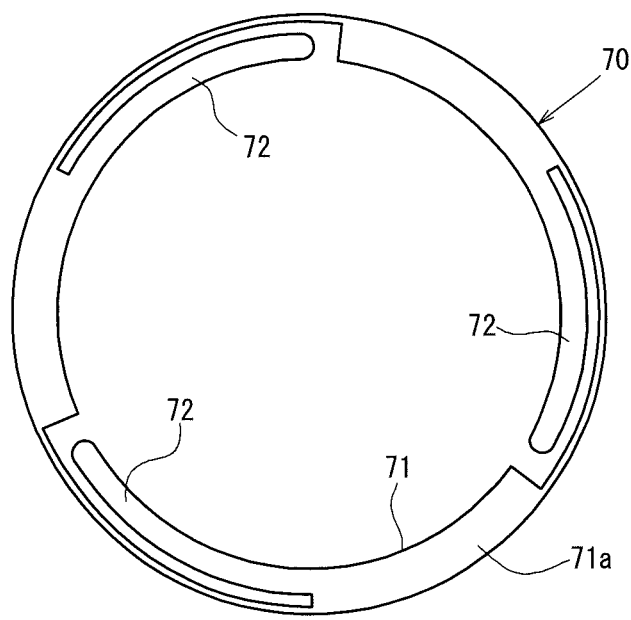
FIGS. 5A and 5B illustrate an annular leaf spring.
Figure 5B:
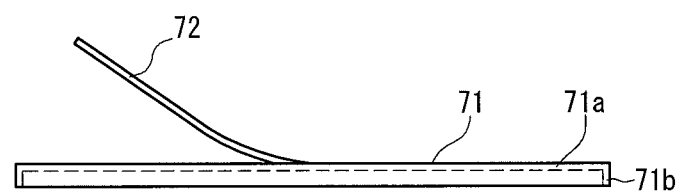

Hereinafter, an embodiment of the present invention will be described with reference to the drawings.
FIG. 1 is a plan view of a steering roll connector 10, and FIG. 2 is a right side view of the steering roll connector 10. FIG. 3 is a cross-sectional view taken along line A-A in FIG. 1, and FIG. 4 is cross-sectional view taken along line B-B in FIG. 2. FIG. 5 illustrates an annular leaf spring 70. FIG. 5A is a plan view of the annular leaf spring 70, and FIG. 5B is a side view of the annular leaf spring 70. In FIG. 3, elements in an accommodation space S are omitted. In FIG. 4, the annular leaf spring 70 is omitted.

In this specification, the terms "top" and "above" refer to the side of a rotator 20 in a rotation axial direction of the steering roll connector 10, and the terms "bottom" and "below" refer to the side of a stator 30 in the rotation axial direction.

As shown in FIG. 1 through FIG. 4, the steering roll connector 10 in this embodiment includes a cable housing 10a and a rotation restriction body 60.

As shown in FIG. 1 through FIG. 3, the cable housing 10a has a generally cylindrical shape having an insertion hole H at a central portion thereof as seen in a plan view. The insertion hole H runs through the cable housing 10a in the steering rotation axial direction (up-down direction in FIG. 2). The insertion hole H has a diameter which allows a steering shaft (not shown) protruding from a steering column (not shown) to be inserted into the insertion hole H. The cable housing 10a includes the stator 30 and the rotator 20 which are rotatable with respect to each other.

A steering wheel for performing a rotation operation is fixed to a top end of the steering shaft.

As shown in FIG. 1 through FIG. 3, the rotator 20 includes a rotatable-side ring plate 21 having an annular shape and acting as a top board, and a generally cylindrical rotatable-side inner circumferential cylindrical section 22 extending downward from an inner circumferential edge of the rotatable-side ring plate 21.

As shown in FIG. 3, a ring-shaped leaf spring bearing section 23 extending inward in a diametrical direction is provided at a generally central position in the axial direction of the rotatable-side inner circumferential cylindrical section 22. The leaf spring bearing section 23 has a groove 23a formed in a top surface thereof. The groove 23a is formed along an inner circumferential surface of the rotatable-side inner circumferential cylindrical section 22.

As shown in FIG. 3, a bottom part of the rotatable-side inner circumferential cylindrical section 22 of the rotator 20 is in engaged with a sleeve 40.

The sleeve 40 can be fixed to the rotatable-side inner circumferential cylindrical section 22 in the state of being in engagement therewith. The sleeve 40 has a generally cylindrical shape having an inner diameter which allows the steering shaft protruding from the steering column to be inserted into the sleeve 40. The sleeve 40 has a function of guiding the insertion of the steering shaft.

The sleeve 40 may be formed integrally with the rotatable-side inner circumferential cylindrical section 22 and extend therefrom. Alternatively, the sleeve 40 may be, for example, integrally formed with a fixed-side inner circumferential cylindrical section 32 in the state of being in engagement therewith.

As shown in FIG. 3 and FIG. 4, along an inner circumferential edge of the leaf spring bearing section 23, a plurality of pairs of slide guides 25 are located at an equal interval in a circumferential direction.

The slide guides 25 each have the following shape. A part of the circumferential edge of the leaf spring bearing section 23 extends obliquely downward and inward in the diametrical direction, and then extends vertically downward. The slide guides 25 guide a movement of the rotation restriction body 60 between a restriction position and a restriction release position, described later, in the axial direction, and are rotatable together with the rotator 20.

The rotator 20 is fixed to the steering wheel and is rotatable together with the steering wheel. In more detail, the rotator 20 is coaxially rotatable with the steering wheel.

The rotator 20 is provided with a rotator-side post 24 which is integrally rotatable with the rotator 20. As shown in FIG. 1 through FIG. 3, the rotator-side post 24 is located on the rotatable-side ring plate 21 such that a connector-connecting opening thereof is directed upward.

The rotator-side post 24 is connected to, for example, a steering-side cable 1 drawn from an electrical circuit of a horn switch, an airbag unit or the like located on the steering wheel.

The stator 30 is fixed to an appropriate component on the side of the vehicle body, for example, a combination bracket switch (not shown) located inside the steering column, and is rotatable with respect to the steering wheel. As shown in FIG. 2 through FIG. 4, the stator 30 includes a fixed-side outer circumferential cylindrical section 31, the fixed-side inner circumferential cylindrical section 32, and a fixed-side ring plate 33.

As shown in FIG. 3 and FIG. 4, the fixed-side outer circumferential cylindrical section 31 has a cylindrical shape having a slightly smaller diameter than an outer diameter of the rotatable-side ring plate 21 of the rotator 20 and extends in the axial direction.

As shown in FIG. 3 and FIG. 4, the fixed-side inner circumferential cylindrical section 32 has a cylindrical shape having a slightly smaller diameter than an inner diameter of the rotatable-side inner circumferential cylindrical section 22 and extends in the axial direction. The fixed-side inner circumferential cylindrical section 32 is located concentrically with the fixed-side outer circumferential cylindrical section 31. The fixed-side inner circumferential cylindrical section 32 is located inner to the fixed-side outer circumferential cylindrical section 31 in the diametrical direction, and faces an inner circumferential surface of the fixed-side outer circumferential cylindrical section 31 at an interval therefrom. At a top end of an inner circumferential surface of the fixed-side inner circumferential cylindrical section 32, a plurality of stop sections 34 engageable with engaging sections 64 of the rotation restriction body 60 described later are located at an equal interval in the circumferential direction.

As shown in FIG. 4, the stop sections 34 are each formed between the engaging sections 64, adjacent to each other, of the rotation restriction body 60 and extend inward in the diametrical direction from the top end of the inner circumferential surface of the fixed-side inner circumferential cylindrical section 32. The stop sections 34 each have a fan shape, as seen in a plan view, having an inner diameter which is approximately equivalent to an outer diameter of the rotation restriction body 60 (outer diameter of a cylindrical section 62 of the rotation restriction body 60 described later).

As shown in FIG. 3, the fixed-side ring plate 33 is annular and is located to connect a generally central part in the axial direction of the inner circumferential surface of the fixed-side outer circumferential cylindrical section 31 and a generally central part in the axial direction of an outer circumferential surface of the fixed-side inner circumferential cylindrical section 32 to each other.

The stator 30 is also provided with a stator-side connector 35.

As shown in FIG. 3 and FIG. 4, the stator-side connector 35 is located below the stator 30 such that a connector-connecting opening thereof is directed laterally. The stator-side connector 35 is connected to each of cables (not shown) drawn from an electrical circuit or the like on the side of the vehicle body in a lower column cover (not shown).

The stator 30 and the rotator 20 having such a structure are located such that the outer circumferential surface of the fixed-side inner circumferential cylindrical section 32 and the inner circumferential surface of the rotatable-side inner circumferential cylindrical section 22 face each other in the diametrical direction. In addition, the stator 30 and the rotator 20 are assembled coaxially with the rotation axis of the steering shaft. Thus, the cable housing 10*a* is structured. As shown in FIG. 3 and FIG. 4, in the cable housing 10*a*, the fixed-side ring plate 33 of the stator 30 faces the rotatable-side ring plate 21 of the rotator 20 in the axial direction, and the fixed-side outer circumferential cylindrical section 31 of the stator 30 faces, and is located outer in the diametrical direction to, the rotatable-side inner circumferential cylindrical section 22 of the rotator 20. Thus, the accommodation space S is formed.

The accommodation space S accommodates a flat cable C for electrically connecting an electric device such as a horn module, an airbag module, an audio control module or the like provided on the side of the steering wheel and a power supply on the side of the vehicle body to each other. When being accommodated in the accommodation space S, the flat cable C can follow the rotation of the steering wheel to be wound and rewound.

In more detail, as shown in FIG. 3 and FIG. 4, a retainer 50 (shown in FIG. 4, omitted in FIG. 3) and the flat cable C are accommodated in the accommodation space S.

As shown in FIG. 4, the retainer 50 includes a base ring 51 and a plurality of rotatable rollers 52, and is placed on a bottom surface of the stator 30, which is an element to form the accommodating space S, such that the retainer 50 is rotatable around a rotation axis of the rotator 20.

The base ring 51 has an annular shape, as seen in a plan view, which can be accommodated in the accommodating space S. On the base ring 51, a plurality of guide walls 53, a press guide 54, and roller support projections (not shown) for supporting the rotatable rollers 52 stand toward the accommodation space S. A plurality of the roller support projections are provided at an equal interval in a circumferential direction of the base ring 51.

As shown in FIG. 4, the guide walls 53 are each located between the rotatable rollers 52 adjacent to each other in the circumferential direction. The guide walls 53 each have a concave shape, as seen in a plan view, having an opening on the diametrically outer side so as to guide the flat cable C (inside wound part Ci of the flat cable described later) which is wound along an outer circumferential surface of the rotatable-side inner circumferential cylindrical section 22 of the rotator 20.

As shown in FIG. 4, the press guide 54 has a bow shape as seen in a plan view. The press guide 54 is located in a curved state along one of the plurality of guide walls 53, such that when the flat cable C is wound in a U shape along one rotatable roller 52 close the one guide wall 53 and thus is turned around, the press guide 54 is located along the turned-around part (reversed part Cr of the flat cable C described later).

As shown in FIG. 4, the rotatable rollers 52 are each supported so as to be rotatable around an axis thereof parallel to the rotation axis of the rotator 20.

The flat cable C is a band-like flexible transmission line including a plurality of flat conductors which are located parallel to each other at a predetermined pitch and are covered with an insulating cover. The flat cable C is accommodated in the accommodation space S in a wound state, and electrically connects the rotator-side post 24 and the stator-side connector 35 to each other.

In more detail, one end in a length direction of the flat cable C is connected to the rotator-side post 24, and the other end thereof is connected to the stator-side connector 35.

The flat cable C is supported by the retainer 50, which is located on the fixed-side ring plate 33 so as to be rotatable with respect thereto, in the accommodation space S inside the cable housing 10*a*. In the accommodation space S, the flat cable C is wound.

This will be described in more detail. The flat cable C is drawn from the stator-side connector 35 into the accommodation space S. As shown in FIG. 3 and FIG. 4, the flat cable C includes an outside wound part Co wound along the inner circumferential surface of the fixed-side outer circumferential cylindrical section 31 of the stator 30, outside the retainer 50.

The flat cable C includes the reversed part Cr in the middle of the length direction thereof. The reversed part Cr is a part which is wound in a U shape along one of the rotatable rollers 52 to turn around.

The flat cable C also includes the inside wound part Ci, which is a part closer than the revered part Cr to a tip thereof in the length direction, and is wound along the outer circumferential surface of the rotatable-side inner circumferential cylindrical section 22 of the rotator 20, inside the retainer 50. The flat cable C is finally drawn out of the accommodation space S and is connected to the rotator-side post 24.

The flat cable C is accommodated in the accommodation space S as being wound a plurality of times, but FIG. 3 and FIG. 4 show the flat cable C as being wound once for the sake of simplicity.

In the meantime, as shown in FIG. 3 and FIG. 4, the rotation restriction body 60 for restricting the rotator 20 and the stator 30 from rotating with respect to each other and releasing the rotator 20 and the stator 30 from the restriction includes a bottom ring plate 61, the cylindrical section 62 and a brim section 63.

As shown in FIG. 3 and FIG. 4, the bottom ring plate 61 has an annular shape having an outer diameter slightly smaller than an inner diameter of the leaf spring bearing section 23 of the rotator 20, and acts as a bottom plate of the rotation restriction body 60. The bottom ring plate 61 has an inner diameter which allows the steering shaft to be inserted into the bottom ring plate 61.

As shown in FIG. 3 and FIG. 4, the cylindrical section 62 has a generally cylindrical shape extending upward from an outer circumferential edge of the bottom ring plate 61. The cylindrical section 62 has openings X and the engaging sections 64.

The openings X each have an arc length which is approximately equivalent to that of each pair of slide guides 25 in the circumferential direction of the cylindrical section 62. The openings X extend in the axial direction of the cylindrical section 62 and are formed from the vicinity of a top end of the cylindrical section 62 to a bottom end thereof and also to the vicinity of the outer circumferential edge of the bottom ring plate 61. The openings X are provided in the circumferential direction in an equal number to that of the pairs of slide guides 25.

The plurality of engaging sections 64 stand on an outer circumferential surface of the cylindrical section 62 excluding the openings X so as to protrude outward in the diametrical direction at a generally central part in the axial direction.

As shown in FIG. 3, the brim section 63 includes an inclining section 63*a* having a mortar shape inclining obliquely upward and outward in the diametrical direction from a top end of an outer circumferential edge of the cylindrical section 62, and a brim ring section 63*b* extending from an outer circumferential edge of the inclining section 63*a* and having an annular shape having an outer diameter which is equivalent to an outer diameter of the leaf spring bearing section 23. The brim ring section 63*b* is generally parallel to the rotatable-side ring plate 21 of the rotator 20.

The rotation restriction body 60 having such a structure is in engagement with the rotator 20 so as to be rotatable therewith. In more detail, the engaging sections 64 of the rotation restriction body 60 are located below, in the axial direction, the leaf spring bearing section 23 of the rotator 20, and the openings X of the rotation restriction body 60 are respectively in engagement with the pairs of slide guides 25 of the rotator 20. The rotation restriction body 60 is elastically supported by the annular leaf spring 70 located on the leaf spring bearing section 23 of the rotator 20.

As shown in FIG. 5, the annular leaf spring 70 includes a base section 71 and a plurality of tongue sections 72.

The base section 71 includes a planar section 71*a* which is thin plate-like and annular, and an outer circumferential surface section 71*b* formed by folding an outer circumferential edge of the planar section 71*a* downward in the axial direction.

As shown in FIG. 5A, the plurality of tongue sections 72 are provided at an equal interval in the circumferential direction and each have an arc shape cut out from the base section 71 as seen in a plan view. As shown in FIG. 5B, as seen in a side view, each tongue section 72 is raised obliquely upward in the axial direction while a part thereof in the vicinity of the base section 71 is curved in a generally parabolic manner. The tongue sections 72 each have a height in the axial direction which is slightly larger than the distance by which the rotation restriction body 60 moves between the restriction position and the restriction release position. FIG. 5B shows one tongue section 72 for the sake of simplicity.

As shown in FIG. 3, the annular leaf spring 70 is located on the leaf spring bearing section 23 by the outer circumferential surface section 71*b* being inserted into the groove 23*a* of the leaf spring bearing section 23, and elastically supports the rotation restriction body 60 by the tongue sections 72.

The annular leaf spring 70 is preferably formed of SUS (stainless steel). In consideration of weakening of the spring due to repeated use, the annular leaf spring 70 is more preferably formed of SUS301EH (a heat treated material of SUS631H: SUS631H and SUS301Eh are stainless steels as classified by the Japanese Industrial Standard standards).

In the steering roll connector 10 having the above-described structure, the rotation restriction body 60 moves between the restriction position and the restriction release position to restrict the rotator 20 and the stator 30 from rotating with respect to each other and to release the rotator 20 and the stator 30 from the restriction. This operation will be described with reference to FIG. 6 and FIG. 7.

Figure 6:
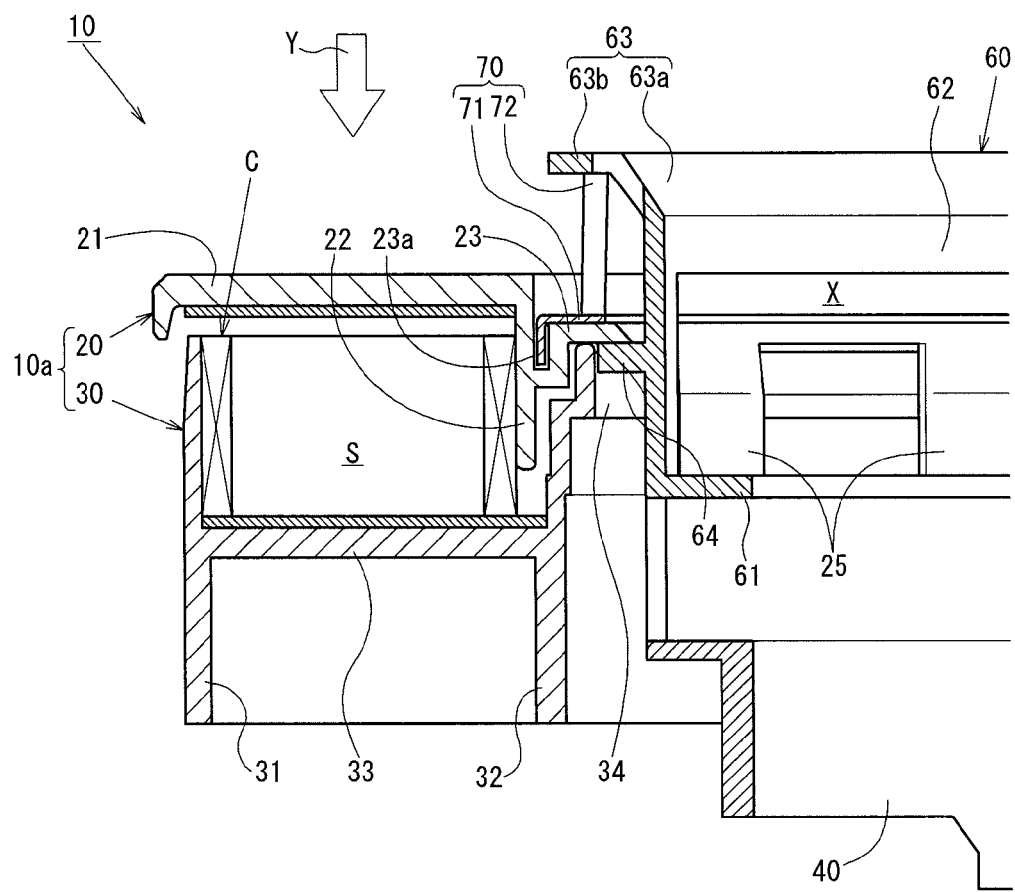
FIG. 6 is an enlarged view of an important part of the rotation restriction body showing a state thereof at a restriction position.
Figure 7:
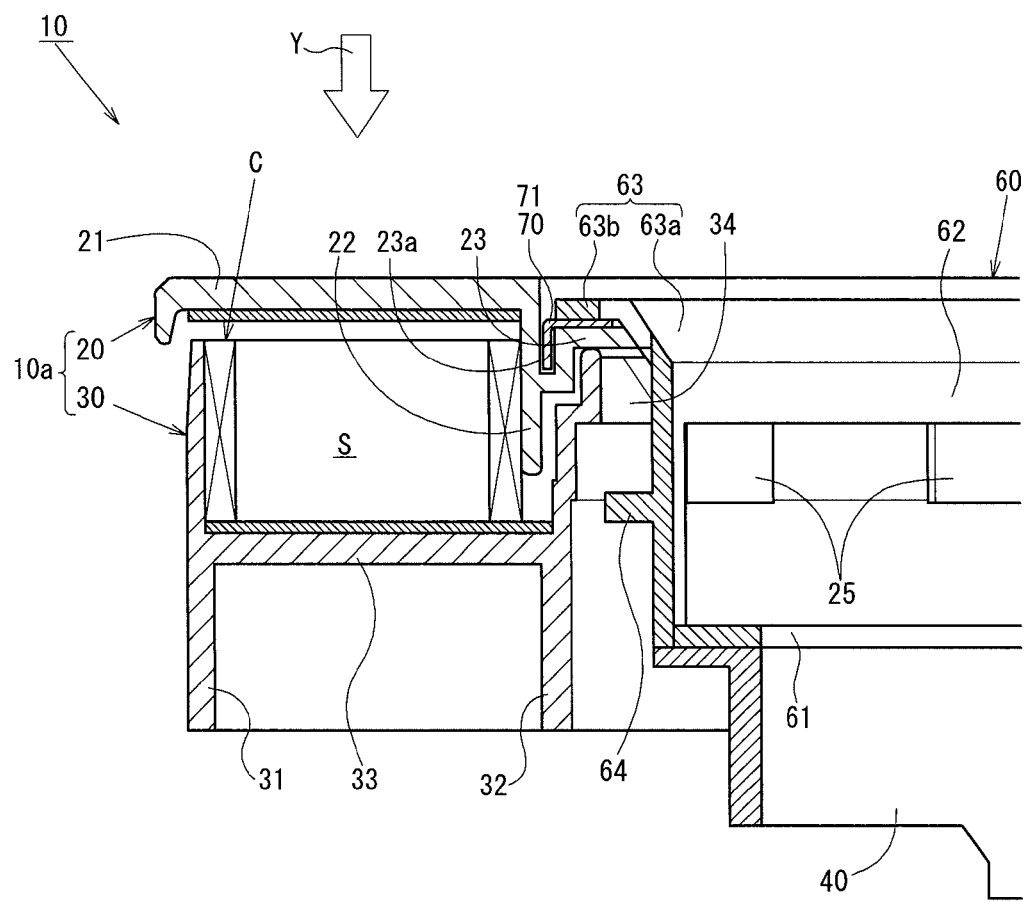
FIG. 7 is an enlarged view of an important part of the rotation restriction body showing a state thereof at a restriction release position.

FIG. 6 is an enlarged cross-sectional view of an important part of the rotation restriction body 60 showing a state thereof at the restriction position, and FIG. 7 is an enlarged cross-sectional view of an important part of the rotation restriction body 60 showing a state thereof at the restriction release position.

As shown in FIG. 6, when the steering wheel is not attached, the rotation restriction body 60 is at the restriction position for restricting the rotator 20 and the stator 30 from rotating with respect to each other. It is assumed that in the state where the position of the steering roll connector 10 in the rotation direction is at a neutral position in clockwise and counterclockwise directions and the flat cable C in the accommodation space S is wound without being lopsided, the rotator 20 and the stator 30 are restricted from rotating with respect to each other.

As shown in FIG. 6, the rotation restriction body 60 at the restriction position is located such that the brim section 63 is elastically supported by the tongue sections 70 of the annular leaf spring 70 located on the rotator 20 and thus is away from the leaf spring bearing section 23 by a distance corresponding to the height in the axial direction of the tongue sections 72.

In this state, the engaging sections 64 of the rotation restriction body 60 contact a bottom surface in the axial direction of the leaf spring bearing section 23 and is in engagement with the stator 30 between the stop sections 34 adjacent to each other in the circumferential direction. Owing to this, the movement of the rotation restriction body 60 in the circumferential direction is restricted. Namely, the rotator 20 rotatable together with the rotation restriction body 60 is restricted from rotating with respect to the stator 30.

Now, an operation of the rotation restriction body 60 when the steering wheel is attached will be described.

When the steering wheel is attached to the steering shaft, as shown in FIG. 6, the rotation restriction body 60 is pressed downward in the axial direction (direction of arrow Y in FIG. 6) by the cored bar (not shown) of the steering wheel. As a result, the rotation restriction body 60 is moved downward in the axial direction along the slide guides 25 of the rotator 20.

In this state, the brim section 63 of the rotation restriction body 60 presses a tip of each tongue section 72 of the annular leaf spring 70 downward in the axial direction. Therefore, the tongue sections 72 of the annular leaf spring 70 fall downward in the axial direction around the vicinity of the base section 71.

When the steering wheel is completely attached to the steering shaft, as shown in FIG. 7, the rotation restriction body 60 moves to the restriction release position at which the brim ring section 63b of the brim section 63 contacts the base section 71 of the annular leaf spring 70 in the axial direction.

In this state, the tongue sections 72 of the annular leaf spring 70 are completely crushed by the brim section 63. Namely, at the restriction release position, the height in the axial direction of an accommodation space for accommodating the annular leaf spring 70 is approximately equivalent to a thickness of the base section 71 of the annular leaf spring 71.

At the restriction release position, the engaging sections 64 of the rotation restriction body 60 are at such positions that are released from the engagement with the stop sections 34 of the stator 30. Owing to this, the rotator 20 engaged with the rotation restriction body 60 so as to be rotatable therewith is released from the restriction on the relative rotation with respect to the stator 30.

Now, an operation of the rotation restriction body 60 when the steering wheel is detached for the purpose of repair or the like will be described.

After the position of the steering wheel in the rotation direction is set to the neutral position in the clockwise and counterclockwise directions, the steering wheel is detached. As a result, the rotation restriction body 60 is pushed upward in the axial direction along the slide guides 25 by a repulsive power generated by the elasticity of the tongue sections 72 of the annular leaf spring 70, and thus is moved from the restriction release position to the restriction position.

In this state, the position of the steering wheel in the rotation direction is at the neutral position. Therefore, the engaging sections 64 of the rotation restriction body 60 are put into engagement with the stator 30 between the stop sections 34 adjacent to each other. The rotation restriction body 60 is moved to the restriction position completely and restricts the rotator 20 and the stator 30 from rotating with respect to each other.

The steering roll connector 10 having the above-described structure and realizing the above-described operations can be suppressed in height in an axial direction and can fulfill the requirement of size reduction.

Specifically, when the steering wheel is not attached, the rotation restriction body 60 is elastically supported at the restriction position by the tongue sections 72, and the engaging sections 64 of the rotation restriction body 60 are in engagement with the stop sections 34 of the stator 30 in the circumferential direction. Thus, the rotation restriction body 60 can restrict the rotator 20 and the stator 30 from rotating with respect to each other.

When the steering wheel is attached, the rotation restriction body 60 is moved to the restriction release position. As a result, the engaging sections 64 of the rotation restriction body 60 and the stop sections 34 of the stator 30 are released from the engagement, and thus the rotator 20 and the stator 30 become rotatable with respect to each other.

In this state, the steering wheel presses the rotation restriction body 60 and thus can significantly bend the tongue sections 72 of the annular leaf spring 70 in the axial direction. Therefore, the height difference in the axial direction between the rotator 20 and the brim section 63 of the rotation restriction body 60 can be made approximately equivalent to the thickness of the tongue sections 72. Namely, when the rotation restriction body 60 is at the restriction release position, the height of the accommodation space for accommodating the annular leaf spring 70 can be suppressed to be approximately equivalent to the thickness of the annular leaf spring 70.

Owing to this, the ratio of the height in the axial direction of the accommodation space for accommodating the annular leaf spring 70 with respect to the height in the axial direction of the steering roll connector 10 can be significantly reduced. Namely, even though the height in the axial direction of the steering roll connector 10 is suppressed, the stroke amount by which the rotation restriction body 60 moves between the restriction position and the restriction release position can have a margin. As a result, the rotator 20 and the stator 30 can be restricted from rotating with respect to each other, and can be released from the restriction, with certainty.

In addition, use of the annular leaf spring 70 can reduce the weight of the steering roll connector 10.

Therefore, the rotation restriction body 60 moving between the restriction position and the restriction release position is elastically supported by the annular leaf spring 70, and thus the height in the axial direction of the accommodation space for accommodating the annular leaf spring 70 can be suppressed. As a result, the steering roll connector 10 can be suppressed in height in the axial direction and can fulfill the requirement of size reduction.

The part of each tongue section 72 in the vicinity of the base section 71 is shaped like being raised in a generally parabolic manner. Therefore, the annular leaf spring 70 can generate a repulsive power by elasticity thereof more stably in a range from a region where the displacement amount of the tongue section 72 in the axial direction is minute to a region where the displacement amount of the tongue section 72 in the axial direction is maximum. Namely, the rotation restriction body 60 is elastically supported stably at the restriction position, and also can move between the restriction position and the restriction release position more stably.

Therefore, the annular leaf spring 70, in which apart of each tongue section 72 in the vicinity of the base section 71 is shaped like being raised in a generally parabolic manner, can stably restrict the rotator 20 and the stator 30 from rotating with respect to each other and can stably release the rotator 20 and the stator 30 from the restriction. Thus, the steering roll connector 10 can be suppressed in height in the axial direction and can fulfill the requirement of size reduction.

The annular leaf spring 70 includes the base section 71 having an annular shape concentric with the rotator 20, and the plurality of tongue sections 72 provided at an equal interval in the circumferential direction of the base section 71. Owing to this, the annular leaf spring 70 can have an annular shape having the plurality of tongue sections 72. Even when the annular leaf spring 70 is rotated on the rotator 20, the interval between the plurality of tongue sections 72 is not changed. Therefore, the annular leaf spring 70 can elastically support the rotation restriction body 60 at the restriction position stably by the repulsive power generated by the elasticity of the tongue sections 72.

Since the plurality of tongue sections 72 are provided at an equal interval in the circumferential direction, the brim section 63 of the rotation restriction body 60 can be stably supported with good balance. Namely, the rotation restriction body 60 does not move between the restriction position and the restriction release position while being inclined. Therefore, the engaging sections 64 of the rotation restriction body 60 and the stop sections 34 of the stator 30 are put into engagement with each other, and are released from the engagement, with more certainty.

The annular leaf spring 70 includes the outer circumferential surface section 71b, which is inserted into the groove 23a of the leaf spring bearing section 23. Owing to this, the annular leaf spring 70 is prevented from jumping out from the leaf spring bearing section 23 when the rotation restriction body 60 is moved to the restriction position from the restriction release position or when vibration or the like is applied while the rotation restriction body 60 is at the restriction position.

Therefore, owing to the annular shape of the annular leaf spring 70, the rotation restriction body 60 can restrict the rotator 20 and the stator 30 from rotating with respect to each other, and can release the rotator 20 and the stator 30 from the restriction, more certainly. Thus, the steering roll connector 10 can be suppressed in height in the axial direction and can fulfill the requirement of size reduction.

In this embodiment, the annular leaf spring 70 has three tongue sections 72, but the number of the tongue sections 72 is not limited to three. It is preferable that there are three or more tongue sections 72.

The base section 71 of the annular leaf spring 70 has the outer circumferential surface section 71b formed by folding the outer circumferential edge of the planar section 71a downward in the axial direction. The base section 71 is not limited to having such a structure, and may have only the planar section 71a.

The annular leaf spring 70 is placed on the rotator 20 such that the outer circumferential surface section 71b is fit into the groove 23a of the leaf spring bearing section 23. The annular leaf spring 70 is not limited to this, and may be fixed by being welded to the leaf spring bearing section 23.

The location and the elements of the flat cable C in the accommodation space S are not limited to the above, and the flat cable C may have an appropriate structure. The flat cable C may be in any of various other forms. For example, the rotatable rollers 52 or the like may not be located in the accommodation space S, and the flat cable C may be accommodated as being wound spirally. The shape or location of the stop sections 34 of the stator 30 for restricting the rotator 20 and the stator 30 from rotating with respect to each other, and the shape or location of the engaging sections 64 of the rotation restriction body 60 also for restricting the rotator 20 and the stator 30 from rotating with respect to each other, may be any other appropriate shape or location as long as the rotator 20 and the stator 30 are restricted from rotating with respect to each other in the circumferential direction.

The rotatable connector device according to the present invention corresponds to the steering roll connector 10 in the embodiment; and similarly, the plate-like elastic member corresponds to the annular leaf spring 70;

the relative rotation restriction unit corresponds to the rotation restriction body 60, the stop sections 34, or the annular leaf spring 70;

the urging unit corresponds to the annular leaf spring 70; and the single-body plate-like elastic member corresponds to a single-body leaf spring 74.

However, the present invention is not limited to the above-described embodiment, and can be carried out in many other embodiments.

Figure 8A:
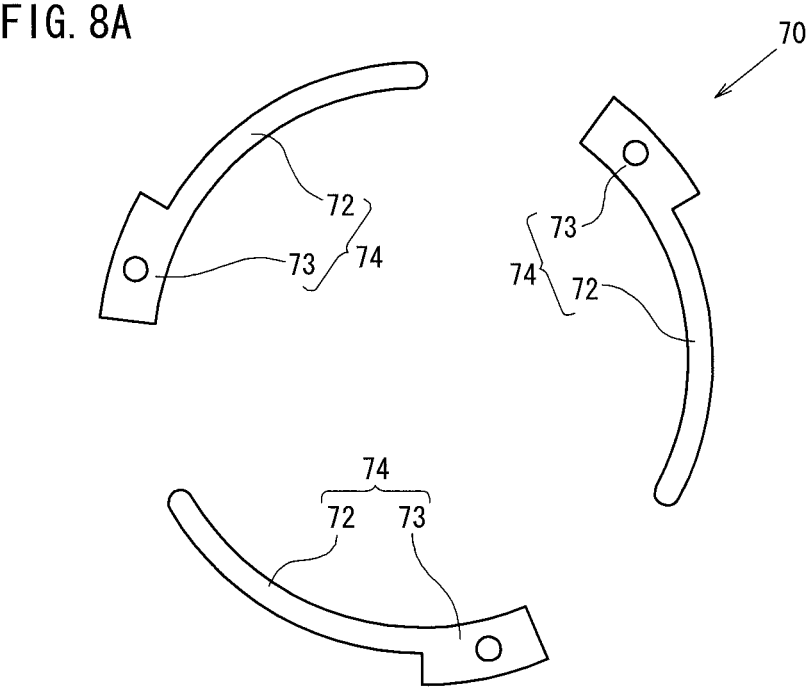
FIGS. 8A and 8B illustrate an annular leaf spring having another shape.
Figure 8B:
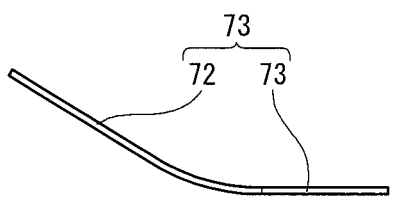

For example, as shown in FIG. 8 showing another shape of the annular leaf spring 70, the annular leaf spring 70 may include a plurality of the single-body leaf springs 74 located in an annular arrangement. The single-body leaf springs 74 each include a tongue section 72 and a thin plate-like base section 73. FIG. 8A is a plan view of the annular leaf spring 70 having the another shape, and FIG. 8B is a side view of the annular leaf spring 70 having the another shape.

The single-body leaf springs 74 are located on the leaf spring bearing section 23 of the rotator 20 at an equal interval in the circumferential direction and fixed by being welded thereto.

Owing to this, in the case where there is no space for locating the annular base section 71 on the rotator 20, the plurality of single-body leaf springs 74 can be located in the circumferential direction of the rotator 20. Alternatively, in the case where the brim section 63 of the rotation restriction body 60 cannot be formed to be annular, the single-body leaf springs 74 can be placed on the rotator 20 in accordance with the shape of the brim section 63 of the rotation restriction body 60. Namely, in the case where the annular leaf spring 70 includes the plurality of single-body leaf springs 74, the size of the steering roll connector 10 in the diametric direction can be reduced by locating the single-body leaf springs 74 in an appropriate manner.

In the case where the annular leaf spring 70 includes the plurality of single-body leaf springs 74, the annular leaf spring 70 can be reduced in weight. Therefore, the weight of the steering roll connector 10 can be reduced.

In the case where the annular leaf spring 70 is provided as being divided in correspondence with the plurality of tongue sections 72 in this manner, the steering roll connector 10 can be suppressed in height in the axial direction and can fulfill the requirement of size reduction.

REFERENCE SIGNS LIST

10 . . . Steering roll connector
20 . . . Rotator
21 . . . Rotatable-side ring plate
22 . . . Rotatable-side inner circumferential cylindrical section
30 . . . Stator
31 . . . Fixed-side outer circumferential cylindrical section
32 . . . Fixed-side inner circumferential cylindrical section 33 ... Fixed-side ring plate
34 ... Stop section
60 ... Rotation restriction body
62 ... Cylindrical section
63 ... Brim section
64 ... Engaging section
70 ... Annular leaf spring
71, 73 ... Base section
72 ... Tongue section
74 ... Single-body leaf spring

The invention claimed is:

1. A rotatable connector device, comprising:
a stator including an annular fixed-side ring plate, a fixed-side outer circumferential cylindrical section having a cylindrical shape and formed along an outer circumferential edge of the fixed-side ring plate, and a fixed-side inner circumferential cylindrical section having a cylindrical shape and formed along an inner circumferential edge of the fixed-side ring plate; and
a rotator including an annular rotatable-side ring plate and a rotatable-side inner circumferential cylindrical section having a cylindrical shape and formed along an inner circumferential edge of the annular rotatable-side ring plate;
wherein an outer circumferential surface of the fixed-side inner circumferential cylindrical section of the stator and an inner circumferential surface of the rotatable-side inner circumferential cylindrical section of the rotator face each other in a diametrical direction, and the stator and the rotator are in engagement with each other coaxially so as to be rotatable with respect to each other in a clockwise direction and a counterclockwise direction;
the rotatable connector device further comprising a relative rotation restriction unit for restricting the stator and the rotator from rotating with respect to each other;
wherein:
the relative rotation restriction unit includes:
a stop section protruding inward in the diametrical direction from a rotator-side end of the fixed-side inner circumferential cylindrical section;
a rotation restriction body rotatable together with the rotator and engageable with the rotator so as to be movable between a restriction position and a restriction release position in the axial direction of the rotator; and
an urging unit, located on the rotator, for elastically supporting the rotation restriction body toward the restriction position;
the rotation restriction body includes:
a cylindrical section having a generally cylindrical shape and facing, in the diametrical direction, an inner circumferential surface of the fixed-side inner circumferential cylindrical section of the stator; and
a brim section formed along a rotator-side outer circumferential edge of the cylindrical section;
the cylindrical section of the rotation restriction body has an engaging section protruding outward in the diametrical direction, the engaging section being engageable with the stop section in the circumferential direction so as to restrict the rotator and the stator from rotating with respect to each other when the rotation restriction body is at the restriction position; and
the urging unit includes a thin plate-like elastic member including a plurality of tongue sections which are shaped like being raised obliquely upward and elastically support the brim section of the rotation restriction body.

2. A rotatable connector device according to claim 1, wherein a rotator-side end of each of the tongue sections is shaped like being raised in a generally parabolic manner.

3. A rotatable connector device according to claim 1, wherein the plate-like elastic member includes:
a base section having an annular shape concentric with the rotator; and
the plurality of tongue sections provided at an equal interval in a circumferential direction of the base section.

4. A rotatable connector device according to claim 1, wherein a single-body plate-like elastic member includes a thin plate-like base section and the plurality of tongue sections formed on the base section; and
the plate-like elastic member includes a plurality of the single-body plate-like elastic members provided at an equal interval in the circumferential direction.

* * * * *